(12) United States Patent
Ma et al.

(10) Patent No.: US 11,536,932 B2
(45) Date of Patent: Dec. 27, 2022

(54) OPTICAL LENS ASSEMBLY

(71) Applicants: Sintai Optical (Shenzhen) Co., Ltd., ShenZhen (CN); Asia Optical Co., Inc., Taichung (TW)

(72) Inventors: Fang-Li Ma, ShenZhen (CN); Bin Liu, ShenZhen (CN); Yue-Ye Chen, ShenZhen (CN); Hua-Tang Liu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 515 days.

(21) Appl. No.: 16/740,563

(22) Filed: Jan. 13, 2020

(65) Prior Publication Data

US 2020/0249431 A1    Aug. 6, 2020

(30) Foreign Application Priority Data

Jan. 31, 2019   (CN) .......................... 201910096140.6

(51) Int. Cl.
| | |
|---|---|
| *G02B 9/62* | (2006.01) |
| *G02B 13/18* | (2006.01) |
| *G02B 27/00* | (2006.01) |
| *G02B 13/00* | (2006.01) |
| *G02B 3/04* | (2006.01) |
| *G02B 5/00* | (2006.01) |

(52) U.S. Cl.
CPC ............... *G02B 9/62* (2013.01); *G02B 13/18* (2013.01); *G02B 3/04* (2013.01); *G02B 5/005* (2013.01); *G02B 13/0045* (2013.01); *G02B 27/0025* (2013.01)

(58) Field of Classification Search
CPC ...... G02B 13/0045; G02B 9/62; G02B 13/18; G02B 5/005; G02B 27/0025; G02B 5/05; G02B 3/04
USPC .......................... 359/713, 739, 756, 757, 759
See application file for complete search history.

(56) References Cited

U.S. PATENT DOCUMENTS

| | | | |
|---|---|---|---|
| 9,575,294 B2 * | 2/2017 | Kubota | ............... G02B 13/0045 |
| 10,281,689 B2 * | 5/2019 | Kubota | ............... G02B 13/0045 |
| 10,488,626 B2 * | 11/2019 | Kubota | ................... G02B 5/005 |
| 10,641,991 B2 * | 5/2020 | Kubota | ..................... G02B 9/64 |

(Continued)

FOREIGN PATENT DOCUMENTS

| | | |
|---|---|---|
| CN | 206039009 U | 3/2017 |
| CN | 108663786 A | 10/2018 |

(Continued)

*Primary Examiner* — Evelyn A Lester
(74) *Attorney, Agent, or Firm* — McClure, Qualey & Rodack, LLP

(57) ABSTRACT

An optical lens assembly includes a first lens, a second lens, a third lens, a fourth lens, a fifth lens, and a sixth lens, all of which are arranged in order from an object side to an image side along an optical axis. The first lens is a meniscus lens with positive refractive power. The second lens is with positive refractive power. The third lens is with negative refractive power. The fourth lens is with positive refractive power and includes a convex surface facing the image side. The fifth lens is with negative refractive power and includes a concave surface facing the object side. The sixth lens is with positive refractive power and includes a convex surface facing the image side.

20 Claims, 9 Drawing Sheets

(56) References Cited

U.S. PATENT DOCUMENTS

| | | | |
|---|---|---|---|
| 10,678,020 B2 * | 6/2020 | Fukaya | G02B 13/0045 |
| 10,678,021 B2 * | 6/2020 | Sekine | G02B 7/021 |
| 10,678,022 B2 * | 6/2020 | Kubota | G02B 13/0045 |
| 10,739,560 B2 * | 8/2020 | Nitta | G02B 9/62 |
| 10,739,568 B2 * | 8/2020 | Kubota | G02B 13/0045 |
| 10,802,248 B2 * | 10/2020 | Kubota | G02B 13/0045 |
| 10,809,500 B2 * | 10/2020 | Kubota | G02B 27/0025 |
| 10,948,693 B2 * | 3/2021 | Kubota | G02B 9/62 |
| 11,016,267 B2 * | 5/2021 | Kubota | G02B 13/0045 |
| 2015/0062720 A1 | 3/2015 | Lai et al. | |
| 2016/0011402 A1 * | 1/2016 | Kubota | G02B 9/62 |
| | | | 359/713 |
| 2016/0011405 A1 * | 1/2016 | Shinohara | G02B 13/0045 |
| | | | 359/713 |
| 2017/0235111 A1 * | 8/2017 | Hashimoto | G02B 13/0045 |
| | | | 359/713 |
| 2017/0329109 A1 * | 11/2017 | Kubota | G02B 9/62 |
| 2018/0157008 A1 * | 6/2018 | Kubota | G02B 5/005 |
| 2019/0004285 A1 | 1/2019 | Tang et al. | |
| 2019/0094497 A1 | 3/2019 | Huang | |
| 2019/0346665 A1 * | 11/2019 | Kubota | G02B 9/62 |
| 2019/0353875 A1 * | 11/2019 | Kubota | G02B 9/62 |
| 2019/0361197 A1 * | 11/2019 | Kubota | G02B 9/62 |
| 2020/0116978 A1 * | 4/2020 | Kwak | G02B 9/04 |
| 2021/0364765 A1 * | 11/2021 | Fukaya | G02B 13/0045 |

FOREIGN PATENT DOCUMENTS

| | | | | |
|---|---|---|---|---|
| JP | 2007-025653 A | | 2/2007 | |
| JP | 2012-155223 A | | 8/2012 | |
| JP | 6865445 B2 | * | 4/2021 | G02B 9/62 |
| TW | I637207 B | | 10/2018 | |

* cited by examiner

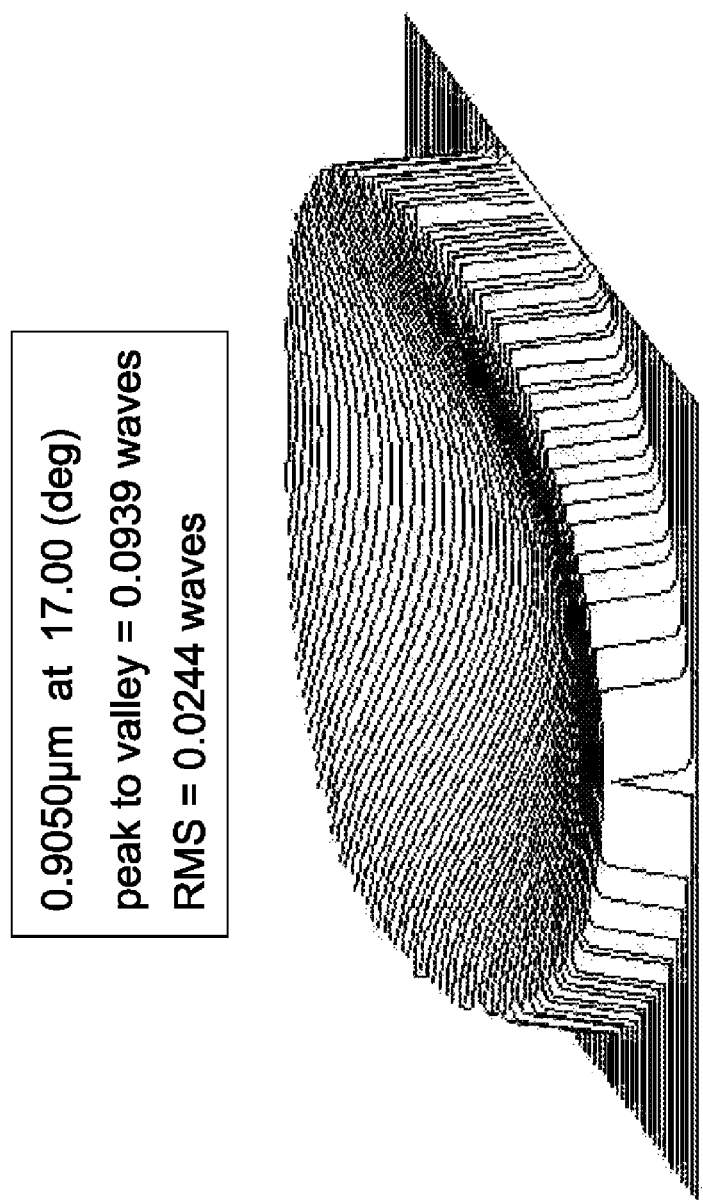

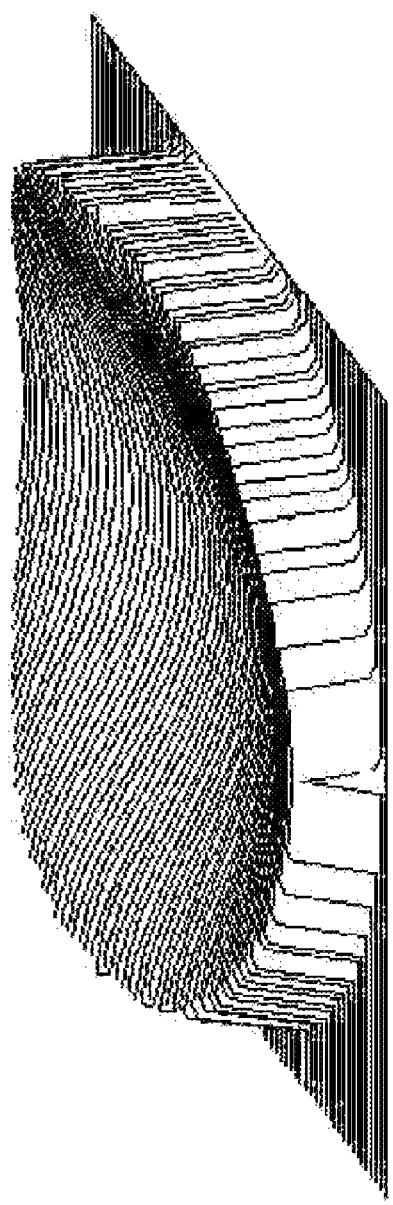

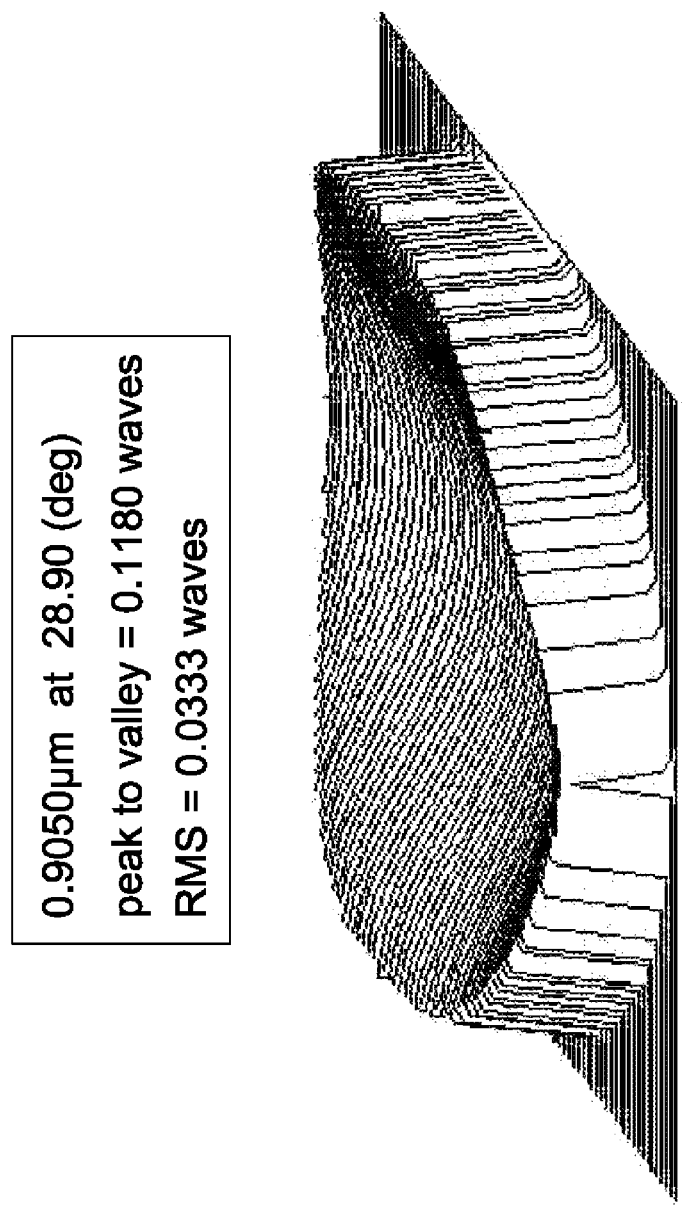

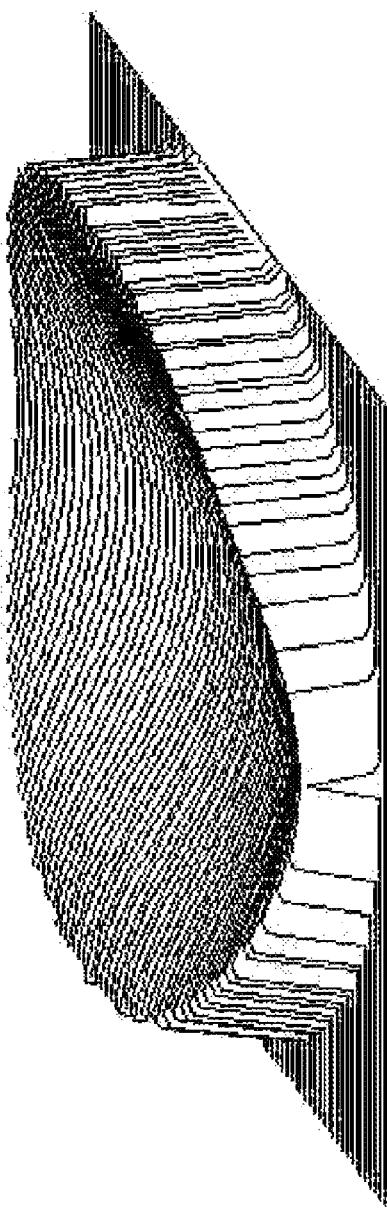

OPTICAL LENS ASSEMBLY

BACKGROUND OF THE INVENTION

Field of the Invention

The invention relates to an optical lens assembly.

Description of the Related Art

LiDAR (Light Detection and Ranging) uses short pulse laser with a wavelength of 905 nm to measure the target distance. Because of high resolution, LiDAR can completely depict the contour of the target so as to meet the sensing requirements of farther and more accuracy for self-driving cars. Therefore, LiDAR is currently widely used in the field of vehicle ranging. In accordance with different targets and applications, the optical lens assembly used in LiDAR needs to have large field of view, miniaturization and small wavefront aberration. However, the known optical lens assembly can't satisfy such requirements. Therefore, the optical lens assembly needs a new structure in order to meet the requirements of large field of view, miniaturization and small wavefront aberration at the same time.

BRIEF SUMMARY OF THE INVENTION

The invention provides an optical lens assembly to solve the above problems. The optical lens assembly of the invention is provided with characteristics of a shortened total lens length, an increased field of view, a decreased wavefront aberration, and still has a good optical performance.

The optical lens assembly in accordance with an exemplary embodiment of the invention includes a first lens, a second lens, a third lens, a fourth lens, a fifth lens, and a sixth lens, all of which are arranged in order from an object side to an image side along an optical axis. The first lens is a meniscus lens with positive refractive power. The second lens is with positive refractive power. The third lens is with negative refractive power. The fourth lens is with positive refractive power and includes a convex surface facing the image side. The fifth lens is with negative refractive power and includes a concave surface facing the object side. The sixth lens is with positive refractive power and includes a convex surface facing the image side.

The optical lens assembly in accordance with another exemplary embodiment of the invention includes a first lens, a second lens, a third lens, a fourth lens, a fifth lens, and a sixth lens, all of which are arranged in order from an object side to an image side along an optical axis. The first lens is a meniscus lens with positive refractive power. The second lens is a meniscus lens with positive refractive power and includes a convex surface facing the object side and a concave surface facing the image side. The third lens is a meniscus lens with negative refractive power and includes a convex surface facing the object side and a concave surface facing the image side. The fourth lens is a meniscus lens with positive refractive power. The fifth lens is with negative refractive power. The sixth lens is with positive refractive power.

The optical lens assembly in accordance with yet another exemplary embodiment of the invention includes a first lens, a second lens, a third lens, a fourth lens, a fifth lens, and a sixth lens, all of which are arranged in order from an object side to an image side along an optical axis. The first lens is a meniscus lens with positive refractive power. The second lens is a meniscus lens with positive refractive power and includes a convex surface facing the object side and a concave surface facing the image side. The third lens is with negative refractive power and includes a concave surface facing the image side. The fourth lens is with positive refractive power. The fifth lens is a meniscus lens and includes a concave surface facing the object side and a convex surface facing the image side. The sixth lens is with refractive power. The optical lens assembly satisfies: $1.81 < f_{456}/f_{123} < 2.12$; wherein $f_{123}$ is an effective focal length of a combination of the first lens, the second lens, and the third lens and $f_{456}$ is an effective focal length of a combination of the fourth lens, the fifth lens, and the sixth lens.

In another exemplary embodiment, the fourth lens further includes a concave surface facing the object side, the fifth lens further includes a convex surface facing the image side, and the sixth lens further includes a concave surface facing the object side.

In yet another exemplary embodiment, the optical lens assembly satisfies $1.9 < f_{456}/f_{123} < 2.1$, where $f_{123}$ is an effective focal length of a combination of the first lens, the second lens, and the third lens and $f_{456}$ is an effective focal length of a combination of the fourth lens, the fifth lens, and the sixth lens; the optical lens assembly satisfies: any one of the $Nd_1$, $Nd_2$, $Nd_4$, and $Nd_6$ is greater than any one of the $Nd_3$ and $Nd_5$; AOE=AOI/2; wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly; an object side surface and an image side surface of the third lens are aspheric surfaces, the concave surface and an image side surface of the fifth lens are aspheric surfaces, and the optical lens assembly further includes a stop disposed between the object side and the first lens; or the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

In another exemplary embodiment, the second lens, the third lens, the fourth lens, the fifth lens, and the sixth lens are meniscus lenses.

In yet another exemplary embodiment, the optical lens assembly satisfies: $1.9 < f_{456}/f_{123} < 2.1$; wherein $f_{123}$ is an effective focal length of a combination of the first lens, the second lens, and the third lens and $f_{456}$ is an effective focal length of a combination of the fourth lens, the fifth lens, and the sixth lens.

In another exemplary embodiment, the optical lens assembly satisfies: any one of the $Nd_1$, $Nd_2$, $Nd_4$, and $Nd_6$ is greater than any one of the $Nd_3$ and $Nd_5$; AOE=AOI/2; wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly.

In yet another exemplary embodiment, an object side surface and an image side surface of the third lens are aspheric surfaces, the concave surface and an image side surface of the fifth lens are aspheric surfaces, the optical lens assembly further includes a stop disposed between the object side and the first lens; or the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

In another exemplary embodiment, the fourth lens includes a concave surface facing the object side and a convex surface facing the image side, the fifth lens includes a concave surface facing the object side and a convex surface facing the image side, and the sixth lens includes a convex surface facing the image side.

In yet another exemplary embodiment, the fourth lens includes a convex surface facing the image side, and the sixth lens includes a convex surface facing the image side.

In another exemplary embodiment, the optical lens assembly satisfies: any one of the $Nd_1$, $Nd_2$, $Nd_4$, and $Nd_6$ is greater than any one of the $Nd_3$ and $Nd_5$; AOE=AOI/2; wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly; an object side surface and an image side surface of the third lens are aspheric surfaces, the concave surface and an image side surface of the fifth lens are aspheric surfaces, and the optical lens assembly further includes a stop disposed between the object side and the first lens; or the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2C is a wavefront function diagram at an incident angle is equal to 17.00 degrees for the optical lens assembly in accordance with the first embodiment of the invention;

FIG. 2D is a wavefront function diagram at an incident angle is equal to 24.04 degrees for the optical lens assembly in accordance with the first embodiment of the invention;

FIG. 2E is a wavefront function diagram at an incident angle is equal to 28.90 degrees for the optical lens assembly in accordance with the first embodiment of the invention;

FIG. 2F is a wavefront function diagram at an incident angle is equal to 34.00 degrees for the optical lens assembly in accordance with the first embodiment of the invention;

DETAILED DESCRIPTION OF THE INVENTION

Figure 1:
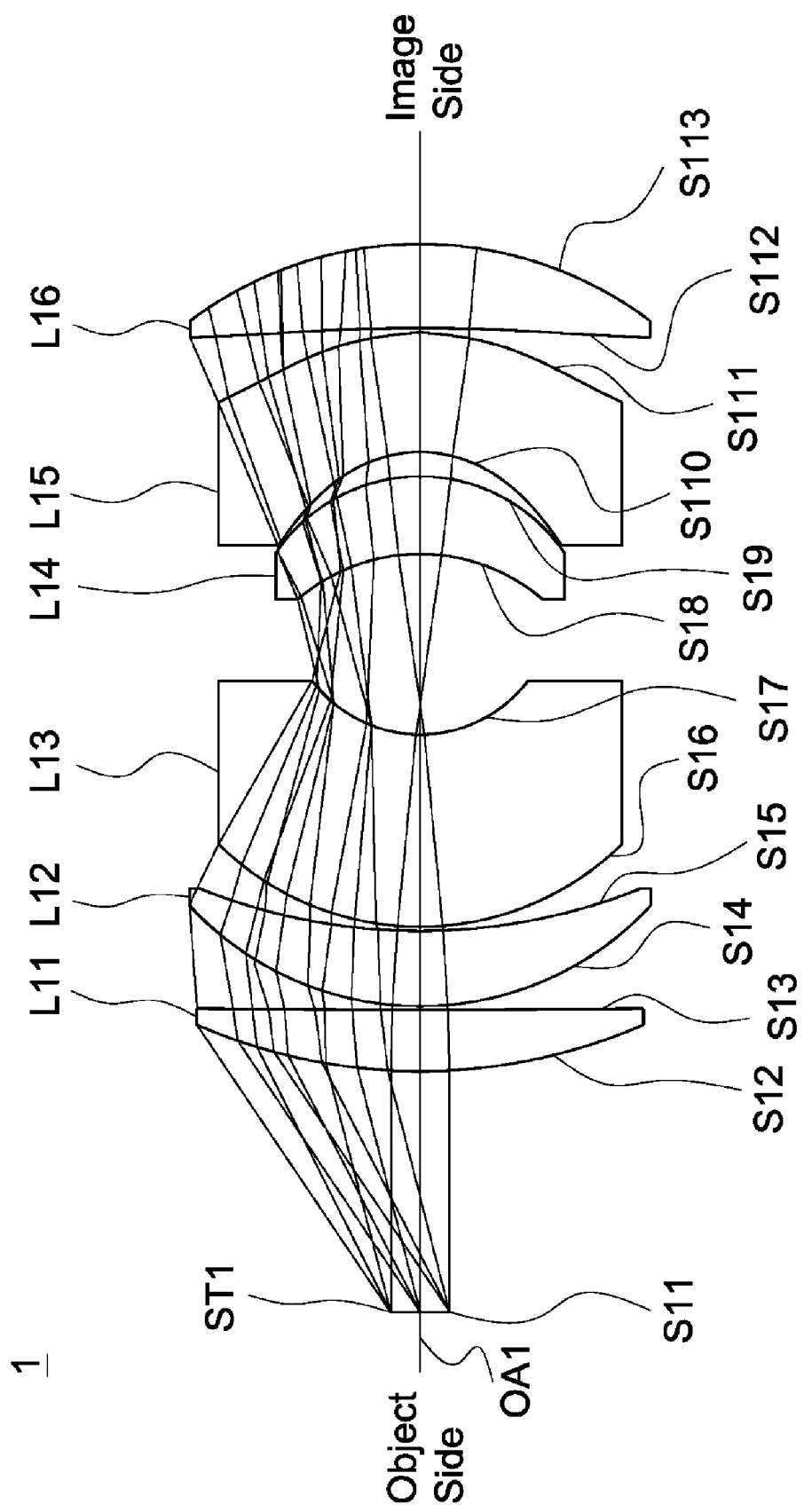
FIG. 1 is a lens layout and optical path diagram of an optical lens assembly in accordance with a first embodiment of the invention.

The following description is made for the purpose of illustrating the general principles of the invention and should not be taken in a limiting sense. The scope of the invention is best determined by reference to the appended claims.

The present invention provides an optical lens assembly including a first lens, a second lens, a third lens, a fourth lens, a fifth lens, and a sixth lens. The first lens is a meniscus lens with positive refractive power. The second lens is with positive refractive power. The third lens is with negative refractive power. The fourth lens is with positive refractive power and includes a convex surface facing an image side. The fifth lens is with negative refractive power and includes a concave surface facing an object side. The sixth lens is with positive refractive power and includes a convex surface facing the image side. The first lens, the second lens, the third lens, the fourth lens, the fifth lens, and the sixth lens are arranged in order from the object side to the image side along an optical axis.

The present invention provides another optical lens assembly including a first lens, a second lens, a third lens, a fourth lens, a fifth lens, and a sixth lens. The first lens is a meniscus lens with positive refractive power. The second lens is a meniscus lens with positive refractive power and includes a convex surface facing an object side and a concave surface facing an image side. The third lens is a meniscus lens with negative refractive power and includes a convex surface facing the object side and a concave surface facing the image side. The fourth lens is a meniscus lens with positive refractive power. The fifth lens is with negative refractive power. The sixth lens is with positive refractive power. The first lens, the second lens, the third lens, the fourth lens, the fifth lens, and the sixth lens are arranged in order from the object side to the image side along an optical axis.

The present invention provides yet another optical lens assembly including a first lens, a second lens, a third lens, a fourth lens, a fifth lens, and a sixth lens. The first lens is a meniscus lens with positive refractive power. The second lens is a meniscus lens with positive refractive power and includes a convex surface facing an object side and a concave surface facing an image side. The third lens is with negative refractive power and includes a concave surface facing the image side. The fourth lens is with positive refractive power. The fifth lens is a meniscus lens and includes a concave surface facing the object side and a convex surface facing the image side. The sixth lens is with refractive power. The first lens, the second lens, the third lens, the fourth lens, the fifth lens, and the sixth lens are arranged in order from the object side to the image side along an optical axis.

Referring to Table 1, Table 2, Table 4, Table 5, Table 7, and Table 8, wherein Table 1, Table 4, and Table 7 show optical specifications in accordance with a first, second, and third embodiments of the invention respectively and Table 2, Table 5, and Table 8 show aspheric coefficients of each aspheric lens in Table 1, Table 4, and Table 7 respectively.

Figure 3:
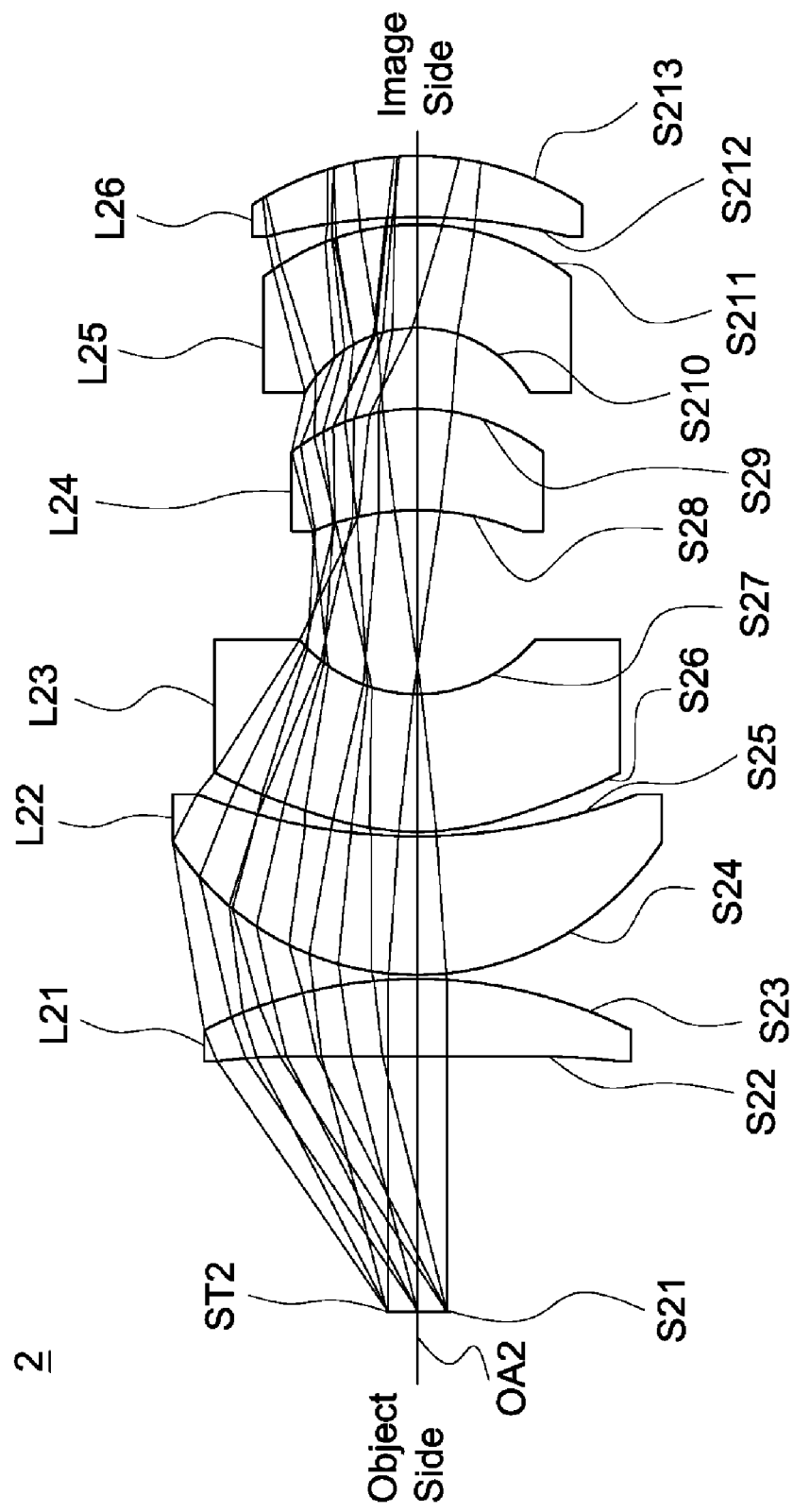
FIG. 3 is a lens layout and optical path diagram of a optical lens assembly in accordance with a second embodiment of the invention.
Figure 4:
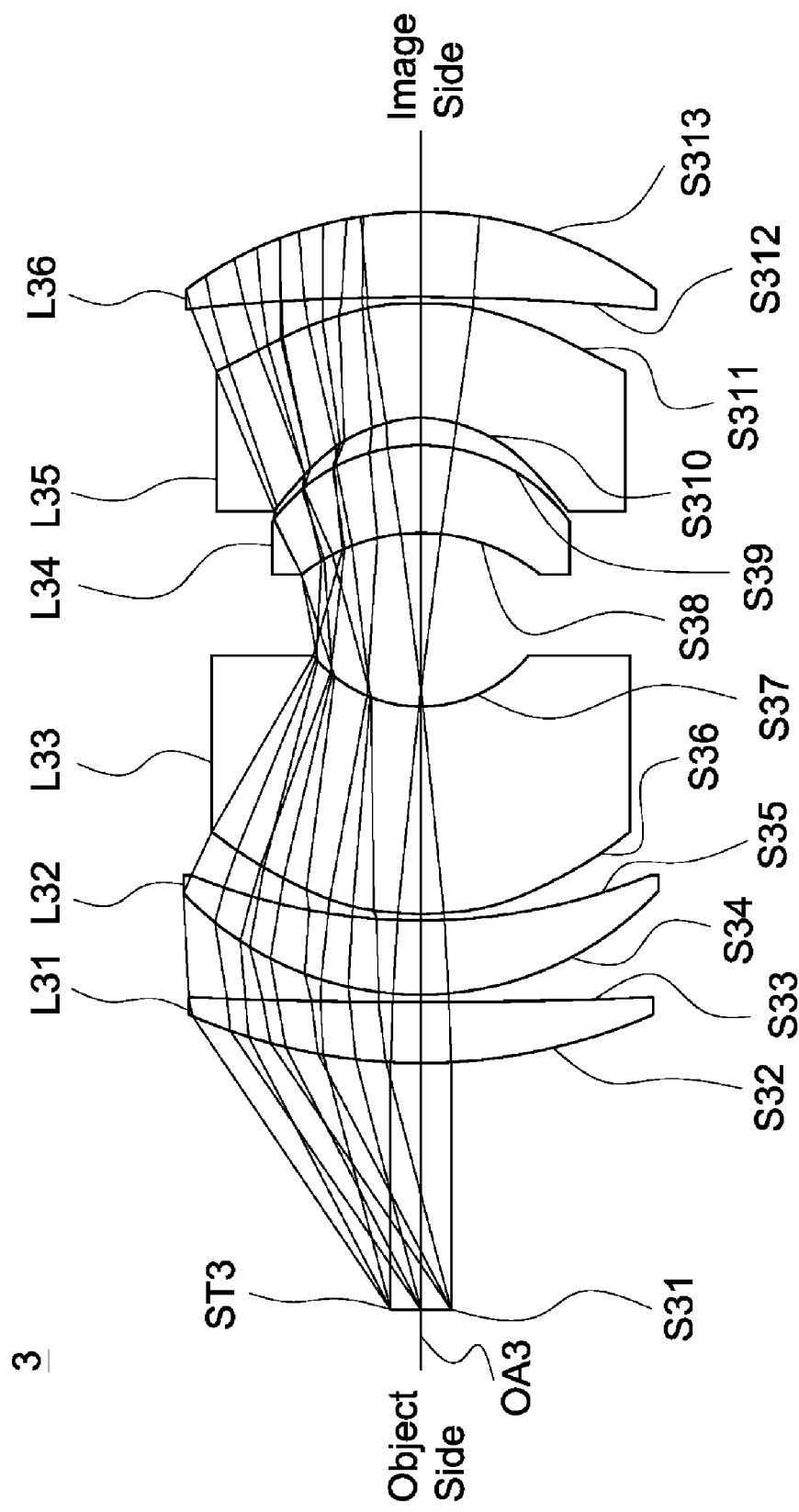
FIG. 4 is a lens layout and optical path diagram of a optical lens assembly in accordance with a third embodiment of the invention.

FIG. 1, FIG. 3, and FIG. 4 are lens layout and optical path diagrams of the optical lens assembly in accordance with the first, second, and third embodiments of the invention respectively.

The first lens L11, L21, L31 are meniscus lenses with positive refractive power and made of glass material, wherein the object side surface S12, S22, S32 and the image side surface S13, S23, S33 are spherical surfaces.

The second lens L12, L22, L32 are with positive refractive power and made of glass material, wherein the object side surface S14, S24, S34 are convex surfaces, the image side surface S15, S25, S35 are concave surfaces, and the object side surface S14, S24, S34 and the image side surface S15, S25, S35 are spherical surfaces.

The third lens L13, L23, L33 are with negative refractive power and made of glass material, wherein the object side surface S16, S26, S36 are convex surfaces, the image side surface S17, S27, S37 are concave surfaces and the object side surface S16, S26, S36 and the image side surface S17, S27, S37 are aspheric surfaces.

The fourth lens L14, L24, L34 are with positive refractive power and made of glass material, wherein the object side surface S18, S28, S38 are concave surfaces, the image side surface S19, S29, S39 are convex surface and the object side surface S18, S28, S38 and the image side surface S19, S29, S39 are spherical surfaces.

The fifth lens L15, L25, L35 are with negative refractive power and made of glass material, wherein the object side surface S110, S210, S310 are concave surfaces, the image side surface S111, S211, S311 are convex surface and the object side surface S110, S210, S310 and the image side surface S111, S211, S311 are aspheric surfaces.

The sixth lens L16, L26, L36 are with positive refractive power and made of glass material, wherein the object side surface S112, S212, S312 are concave surfaces, the image side surface S113, S213, S313 are convex surface and the object side surface S112, S212, S312 and the image side surface S113, S213, S313 are spherical surfaces.

In addition, the optical lens assembly 1, 2, 3 satisfy at least one of the following conditions:

$$1.81 < f_{456}/f_{123} < 2.12; \quad (1)$$

$$Nd_1 > Nd_3; \quad (2)$$

$$Nd_2 > Nd_3; \quad (3)$$

$$Nd_4 > Nd_3; \quad (4)$$

$$Nd_6 > Nd_3; \quad (5)$$

$$Nd_1 > Nd_5; \quad (6)$$

$$Nd_2 > Nd_5; \quad (7)$$

$$Nd_4 > Nd_5; \quad (8)$$

$$Nd_6 > Nd_5; \quad (9)$$

$$AOE = AOI/2; \quad (10)$$

$$0.8 \text{ degree/mm} < FOV/TTL < 1.5 \text{ degree/mm}; \quad (11)$$

$$0.45 < TTL/BFL < 0.75; \quad (12)$$

wherein $f_{123}$ is an effective focal length of a combination of the first lens L11, L21, L31, the second lens L12, L22, L32, and the third lens L13, L23, L33 of the optical lens assembly 1, 2, 3 for the first to third embodiments, $f_{456}$ is an effective focal length of a combination of the fourth lens L14, L24, L34, the fifth lens L15, L25, L35, and the sixth lens L16, L26, L36 of the optical lens assembly 1, 2, 3 for the first to third embodiments, $Nd_1$ is an index of refraction of the first lens L11, L21, L31 for the first to third embodiments, $Nd_2$ is an index of refraction of the second lens L12, L22, L32 for the first to third embodiments, $Nd_3$ is an index of refraction of the third lens L13, L23, L33 for the first to third embodiments, $Nd_4$ is an index of refraction of the fourth lens L14, L24, L34 for the first to third embodiments, $Nd_5$ is an index of refraction of the fifth lens L15, L25, L35 for the first to third embodiments, $Nd_6$ is an index of refraction of the sixth lens L16, L26, L36 for the first to third embodiments, AOI is an angle of incidence of the optical lens assembly 1, 2, 3 for the first to third embodiments, AOE is an angle of emergence of the optical lens assembly 1, 2, 3 for the first to third embodiments, FOV is a field of view of the optical lens assembly 1, 2, 3 for the first to third embodiments, TTL is an interval from the object side surface S12, S22, S32 of the first lens L11, L21, L31 to the image side surface S113, S213, S313 of the sixth lens L16, L26, L36 along the optical axis OA1, OA2, OA3 for the first to third embodiments, and BFL is an interval from the image side surface S113, S213, S313 of the sixth lens L16, L26, L36 to an image plane along the optical axis OA1, OA2, OA3 for the first to third embodiments. Making the optical lens assembly 1, 2, 3 can effectively shorten the total lens length, effectively increase field of view, effectively reduce angle of emergence, effectively reduce wavefront aberration, and effectively correct aberration. Among the above conditions, the upper limit and lower limit of the condition (1): $1.81 < f_{456}/f_{123} < 2.12$ are defined by adding 5% tolerance and subtracting 5% tolerance respectively from the maximum and minimum calculated values of the first, second, and third embodiments. More specifically, $1.81 = 1.91 \times 0.95$ and $2.12 = 2.02 \times 1.05$, so that the better range of $f_{456}/f_{123}$ is to satisfy the condition: $1.91 < f_{456}/f_{123} < 2.02$.

Among the above conditions, the better range of FOV/TTL in condition (11) is to satisfy the condition: 1.0 degree/mm < FOV/TTL < 1.3 degree/mm Among the above conditions, the condition (12): 0.45 < TTL/BFL < 0.75 is suitable for close-range target with a target distance of 100 mm. For a long-distance target with a target distance of 100000 mm, the condition (12) needs to be modified as 0.00045 < TTL/BFL < 0.00075.

It will be appreciated that the upper limit and lower limit of the above conditions can be adjusted by a person skilled in the art within a reasonable tolerance range, wherein the reasonable tolerance range is ±5%.

A detailed description of an optical lens assembly in accordance with a first embodiment of the invention is as follows. Referring to FIG. 1, the optical lens assembly 1 includes a stop ST1, a first lens L11, a second lens L12, a third lens L13, a fourth lens L14, a fifth lens L15, and a sixth lens L16, all of which are arranged in order from an object side to an image side along an optical axis OA1. In operation, a laser beam from the object side passes through the optical lens assembly 1 which leads spot size of the laser beam to be doubled.

According to the description above in connection with FIGS 1, 3, and 4, wherein: in the first lens L11, wherein the object side surface S12 is a convex surface and the image side surface S13 is a concave surface; the second lens L12 is a meniscus lens, wherein the object side surface S14 is a convex surface and the image side surface S15 is a concave surface; the third lens L13 is a meniscus lens, wherein the object side surface S16 is a convex surface and the image side surface S17 is a concave surface; the fourth lens L14 is a meniscus lens, wherein the object side surface S18 is a concave surface; the fifth lens L15 is meniscus lens, wherein the object side surface S111 is a convex surface; the sixth lens L16 is a meniscus lens, wherein the object side surface S112 is a concave surface.

With the above design of the lenses and stop ST1 and at least any one of the conditions (1)-(12) satisfied, the optical lens assembly 1 can have an effective shortened total lens length, an effective increased field of view, an effective reduced angle of emergence, an effective reduced wavefront aberration, and is capable of an effective corrected aberration.

Table 1 shows the optical specification of the optical lens assembly 1 in FIG. 1.

TABLE 1

Total Lens Length = 57.000936 mm
Field of View = 68 Degrees

| Surface Number | Radius of Curvature (mm) | Thickness (mm) | Nd | Vd | Effective Focal Length (mm) | Remark |
|---|---|---|---|---|---|---|
| S11 | ∞ | 16.5 | | | | Stop ST1 |
| S12 | 37.45 | 4.23 | 2.00069 | 25.44 | 39.916 | The First Lens L11 |
| S13 | 1141.6 | 0.3 | | | | |
| S14 | 21.37 | 5.12 | 2.00069 | 25.44 | 41.037 | The Second Lens L12 |
| S15 | 40.79 | 0.3 | | | | |
| S16 | 16.853 | 13.25 | 1.58913 | 61.18 | −67.982 | The Third Lens L13 |
| S17 | 8.399 | 12.420936 | | | | |
| S18 | −12.86 | 5.29 | 1.90366 | 31.42 | 50.304 | The Fourth Lens L14 |
| S19 | −11.88 | 1.73 | | | | |
| S110 | −8.799 | 8.14 | 1.58913 | 61.18 | −46.351 | The Fifth Lens L15 |
| S111 | −17.524 | 0.3 | | | | |
| S112 | −181.65 | 5.92 | 1.90366 | 31.42 | 33.929 | The Sixth Lens L16 |
| S113 | −26.01 | 100 | | | | |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each aspheric surface are shown in Table 2.

TABLE 2

| Surface Number | k | A | B | C | D |
|---|---|---|---|---|---|
| S16 | −0.216171 | −1.703E−005 | −2.945E−008 | −2.823E−010 | 0 |
| S17 | −0.075301 | −2.234E−004 | 3.411E−006 | −3.552E−008 | 0 |
| S110 | −1.070453 | −1.038E−004 | −1.284E−007 | 1.041E−009 | −9.308E−012 |
| S111 | −0.307119 | 1.778E−005 | 7.333E−008 | 2.182E−010 | 3.159E−013 |

Table 3 shows the parameters and condition values for conditions (1)-(12) in accordance with the first embodiment of the invention. It can be seen from Table 3 that the optical lens assembly 1 of the first embodiment satisfies the conditions (1)-(12).

TABLE 3

| | | | | | |
|---|---|---|---|---|---|
| $f_{123}$ | 14.91 mm | $f_{456}$ | 28.42 mm | AOI | 34 degrees |
| AOE | 17 degrees | FOV | 68 degrees | TTL | 57.000936 mm |
| BFL | 100 mm | | | | |
| $f_{456}/f_{123}$ | 1.91 | FOV/TTL | 1.19 degree/mm | TTL/BFL | 0.57 |

By the above arrangements of the lenses and stop ST1, the optical lens assembly 1 of the first embodiment can meet the requirements of optical performance as seen in FIGS. 2A-2F.

Figure 2A:
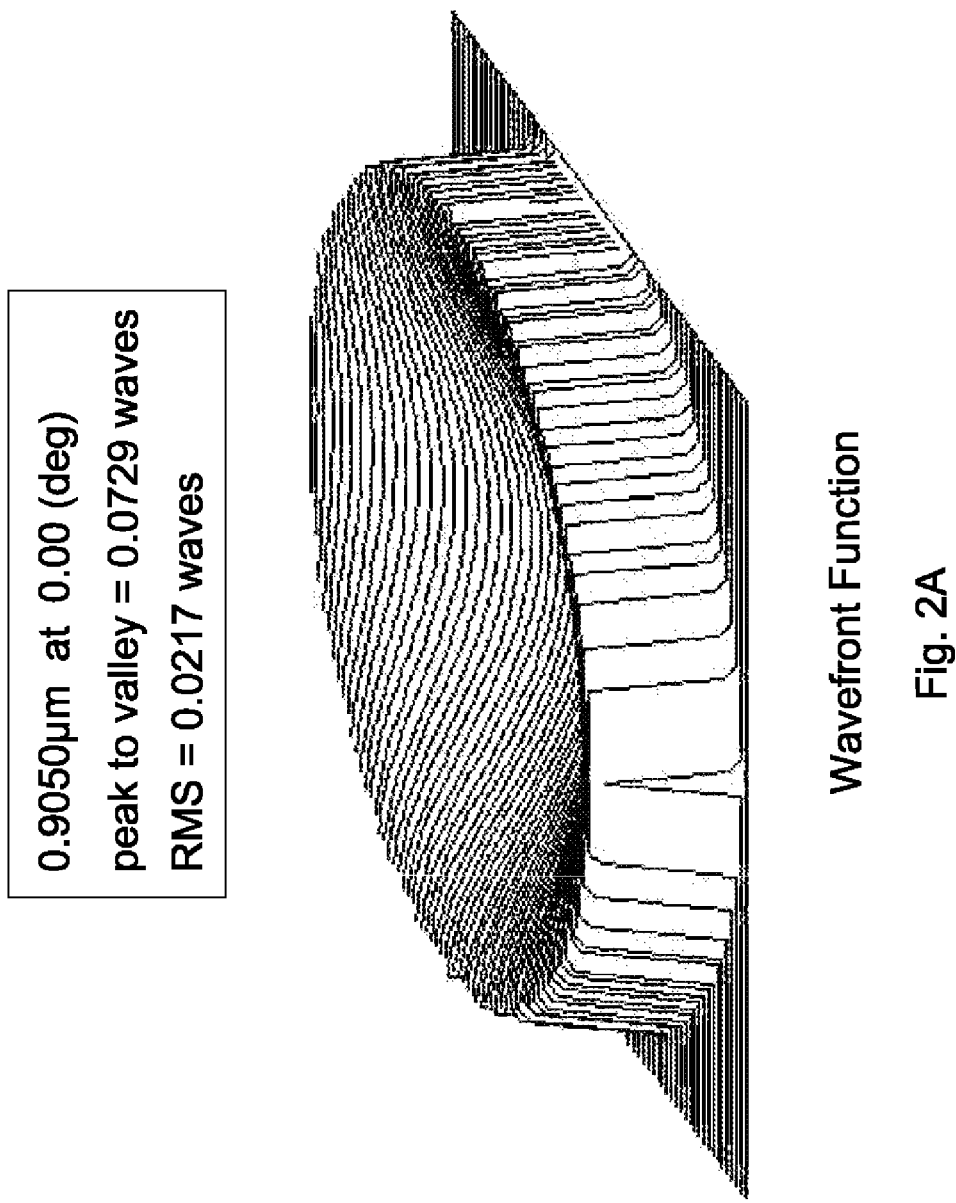
FIG. 2A depicts a wavefront function diagram at an incident angle is equal to 0.00 degrees for the optical lens assembly in accordance with the first embodiment of the invention.

It can be seen from FIG. 2A that the peak to valley wavefront aberration is equal to 0.0729 waves and RMS wavefront aberration is equal to 0.0217 waves at an incident angle is equal to 0.00 degrees for the optical lens assembly 1 of the first embodiment.

Figure 2B:
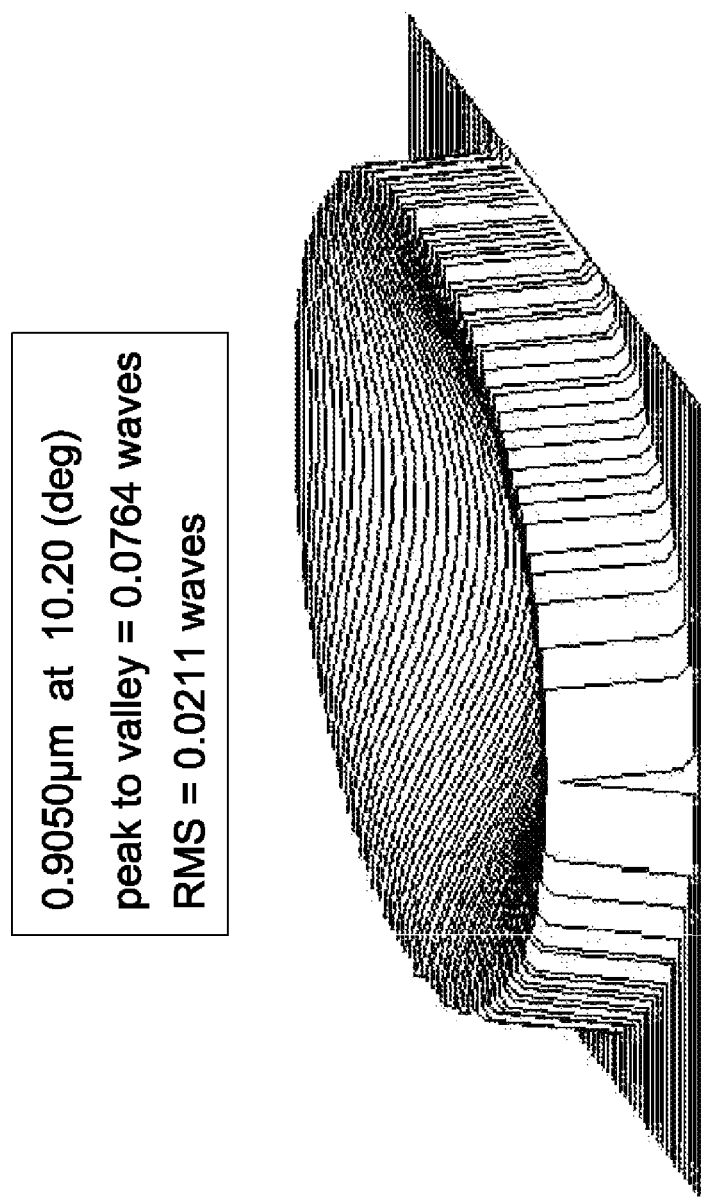
FIG. 2B is a wavefront function diagram at an incident angle is equal to 10.20 degrees for the optical lens assembly in accordance with the first embodiment of the invention.

It can be seen from FIG. 2B that the peak to valley wavefront aberration is equal to 0.0764 waves and RMS wavefront aberration is equal to 0.0211 waves at an incident angle is equal to 10.20 degrees for the optical lens assembly 1 of the first embodiment.

It can be seen from FIG. 2C that the peak to valley wavefront aberration is equal to 0.0939 waves and RMS wavefront aberration is equal to 0.0244 waves at an incident angle is equal to 17.00 degrees for the optical lens assembly 1 of the first embodiment.

It can be seen from FIG. 2D that the peak to valley wavefront aberration is equal to 0.1155 waves and RMS wavefront aberration is equal to 0.0293 waves at an incident angle is equal to 24.04 degrees for the optical lens assembly 1 of the first embodiment.

It can be seen from FIG. 2E that the peak to valley wavefront aberration is equal to 0.1180 waves and RMS wavefront aberration is equal to 0.0333 waves at an incident angle is equal to 28.90 degrees for the optical lens assembly 1 of the first embodiment.

It can be seen from FIG. 2F that the peak to valley wavefront aberration is equal to 0.1311 waves and RMS wavefront aberration is equal to 0.0363 waves at an incident angle is equal to 34.00 degrees for the optical lens assembly 1 of the first embodiment.

It is obvious that the wavefront aberration of the optical lens assembly 1 of the first embodiment can be corrected effectively. Therefore, the optical lens assembly 1 of the first embodiment is capable of good optical performance.

Referring to FIG. 3, FIG. 3 is a lens layout and optical path diagram of an optical lens assembly in accordance with a second embodiment of the invention. The optical lens assembly 2 includes a stop ST2, a first lens L21, a second lens L22, a third lens L23, a fourth lens L24, a fifth lens L25, and a sixth lens L26, all of which are arranged in order from an object side to an image side along an optical axis OA2. In operation, a laser beam from the object side passes through the optical lens assembly 2 which leads spot size of the laser beam to be doubled.

According to the description above in connection with FIGS. 1, 3, and 4, wherein: in the first lens L21, wherein the object side surface S22 is a concave surface and the image side surface S23 is a convex surface; the second lens L22 is a meniscus lens, wherein the surface profiles of the second lens L22 approximate to that of the second lens L12 of the optical lens assembly 1 of the first embodiment, and is not described here again; the third lens L23 is a meniscus lens, wherein the surface profiles of the third lens L23 approximate to that of the third lens L13 of the optical lens assembly 1 of the first embodiment, and is not described here again; the fourth lens L24 is a meniscus lens, wherein the surface profiles of the fourth lens L24 approximate to that of the fourth lens L14 of the optical lens assembly 1 of the first embodiment, and is not described here again; the fifth lens L25 is a meniscus lens, wherein the surface profiles of the fifth lens L25 approximate to that of the fifth lens L15 of the optical lens assembly 1 of the first embodiment, and is not described here again; the sixth lens L26 is a meniscus lens, wherein the surface profiles of the sixth lens L26 approximate to that of the sixth lens L16 of the optical lens assembly 1 of the first embodiment, and is not described here again.

With the above design of the lenses and stop ST2 and at least any one of the conditions (1)-(12) satisfied, the optical lens assembly 2 can have an effective shortened total lens length, an effective increased field of view, an effective reduced angle of emergence, an effective reduced wavefront aberration, and is capable of an effective corrected aberration.

Table 4 shows the optical specification of the optical lens assembly 2 in FIG. 3.

TABLE 4

Total Lens Length = 57.6991 mm
Field of View = 68 Degrees

| Surface Number | Radius of Curvature (mm) | Thickness (mm) | Nd | Vd | Effective Focal Length (mm) | Remark |
|---|---|---|---|---|---|---|
| S21 | ∞ | 16.5 | | | | Stop ST2 |
| S22 | −288.99 | 4.92 | 2.00069 | 25.44 | 35.762 | The First Lens L21 |
| S23 | −31.18 | 0.27 | | | | |
| S24 | 18.56 | 8.88 | 2.00069 | 25.44 | 30.215 | The Second Lens L22 |
| S25 | 38.82 | 0.3 | | | | |
| S26 | 17.749 | 8.74 | 1.58913 | 61.18 | −32.285 | The Third Lens L23 |
| S27 | 7.464 | 11.8391 | | | | |
| S28 | −18.21 | 6.45 | 1.90366 | 31.42 | 32.153 | The Fourth Lens L24 |
| S29 | −12.91 | 5.22 | | | | |
| S210 | −7.557 | 6.84 | 1.58913 | 61.18 | −50.188 | The Fifth Lens L25 |
| S211 | −13.599 | 0.3 | | | | |
| S212 | −40.89 | 3.94 | 1.90366 | 31.42 | 38.528 | The Sixth Lens L26 |
| S213 | −19.36 | 100 | | | | |

The definition of aspheric surface sag z of each aspheric lens in table 4 is the same as that of in Table 1, and is not described here again.

In the second embodiment, the conic constant k and the aspheric coefficients A, B, C, D of each aspheric surface are shown in Table 5.

TABLE 5

| Surface Number | k | A | B | C | D |
|---|---|---|---|---|---|
| S26 | −0.961899 | −4.139E−005 | 3.758E−008 | 4.659E−012 | 0 |
| S27 | −0.172904 | −5.789E−004 | 6.392E−006 | −1.196E−007 | 0 |
| S210 | −0.521553 | −4.993E−006 | 2.924E−007 | 5.190E−009 | 0 |
| S211 | −0.259787 | 2.740E−005 | 1.684E−007 | 6.445E−010 | 0 |

Table 6 shows the parameters and condition values for conditions (1)-(12) in accordance with the second embodiment of the invention. It can be seen from Table 6 that the optical lens assembly 2 of the second embodiment satisfies the conditions (1)-(12).

TABLE 6

| $f_{123}$ | 13.77 mm | $f_{456}$ | 27.77 mm | AOI | 34 degrees |
|---|---|---|---|---|---|
| AOE | 17 degrees | FOV | 68 degrees | TTL | 57.6991 mm |
| BFL | 100 mm | | | | |
| $f_{456}/f_{123}$ | 2.02 | FOV/TTL | 1.18 degree/mm | TTL/BFL | 0.58 |

By the above arrangements of the lenses and stop ST2, the optical lens assembly 2 of the second embodiment can meet the requirements of optical performance.

In addition, the wavefront function diagram (figure is omitted) of the optical lens assembly 2 of the second embodiment approximate to that of the optical lens assembly 1 of the first embodiment, and the wavefront aberration of the optical lens assembly 2 of the second embodiment can be corrected effectively. Therefore, the optical lens assembly 2 of the second embodiment is capable of good optical performance.

Referring to FIG. 4, FIG. 4 is a lens layout and optical path diagram of an optical lens assembly in accordance with a third embodiment of the invention. The optical lens assembly 3 includes a stop ST3, a first lens L31, a second lens L32, a third lens L33, a fourth lens L34, a fifth lens L35, and a sixth lens L36, all of which are arranged in order from an object side to an image side along an optical axis OA3. In operation, a laser beam from the object side passes through the optical lens assembly 3 which leads spot size of the laser beam to be doubled.

According to the description above in connection with FIGS. 1, 3, and 4, wherein: the surface profiles of the first lens L31 approximate to that of the first lens L11 of the optical lens assembly 1 of the first embodiment, and is not described here again; the second lens L32 is a meniscus lens, wherein the surface profiles of the second lens L32 approximate to that of the second lens L12 of the optical lens assembly 1 of the first embodiment, and is not described here again; the third lens L33 is a meniscus lens, wherein the surface profiles of the third lens L33 approximate to that of the third lens L13 of the optical lens assembly 1 of the first embodiment, and is not described here again; the fourth lens L34 is a meniscus lens, wherein the surface profiles of the fourth lens L34 approximate to that of the fourth lens L14 of the optical lens assembly 1 of the first embodiment, and is not described here again; the fifth lens L35 is a meniscus lens, wherein the surface profiles of the fifth lens L35 approximate to that of the fifth lens L15 of the optical lens assembly 1 of the first embodiment, and is not described here again; the sixth lens L36 is a meniscus lens, wherein the surface profiles of the sixth lens L36 approximate to that of the sixth lens L16 of the optical lens assembly 1 of the first embodiment, and is not described here again.

With the above design of the lenses and stop ST3 and at least any one of the conditions (1)-(12) satisfied, the optical lens assembly 3 can have an effective shortened total lens length, an effective increased field of view, an effective reduced angle of emergence, an effective reduced wavefront aberration, and is capable of an effective corrected aberration.

Table 7 shows the optical specification of the optical lens assembly 3 in FIG. 4.

TABLE 7

Total Lens Length = 57.0006 mm
Field of View = 68 Degrees

| Surface Number | Radius of Curvature (mm) | Thickness (mm) | Nd | Vd | Effective Focal Length (mm) | Remark |
|---|---|---|---|---|---|---|
| S31 | ∞ | 16.5 | | | | Stop ST3 |
| S32 | 37.45 | 4.23 | 2.00069 | 25.44 | 39.915 | The First Lens L31 |
| S33 | 1142 | 0.3 | | | | |
| S34 | 21.37 | 5.12 | 2.00069 | 25.44 | 41.028 | The Second Lens L32 |
| S35 | 40.8 | 0.3 | | | | |
| S36 | 16.957 | 13.94 | 1.58913 | 61.18 | −99.304 | The Third Lens L33 |
| S37 | 9.147 | 11.6506 | | | | |
| S38 | −12.38 | 5.86 | 1.90366 | 31.42 | 52.853 | The Fourth Lens L34 |
| S39 | −11.94 | 1.77 | | | | |
| S310 | −8.641 | 7.7 | 1.58913 | 61.18 | −44.373 | The Fifth Lens L35 |

TABLE 7-continued

Total Lens Length = 57.0006 mm
Field of View = 68 Degrees

| Surface Number | Radius of Curvature (mm) | Thickness (mm) | Nd | Vd | Effective Focal Length (mm) | Remark |
|---|---|---|---|---|---|---|
| S311 | −17.266 | 0.3 | | | | |
| S312 | −179.68 | 5.83 | 1.90366 | 31.42 | 33.127 | The Sixth Lens L36 |
| S313 | −25.44 | 100 | | | | |

The definition of aspheric surface sag z of each aspheric lens in table 7 is the same as that of in Table 1, and is not described here again.

In the third embodiment, the conic constant k and the aspheric coefficients A, B, C, D of each aspheric surface are shown in Table 8.

TABLE 8

| Surface Number | k | A | B | C | D |
|---|---|---|---|---|---|
| S36 | −0.212177 | −1.696E−005 | −3.314E−008 | −2.680E−010 | 0 |
| S37 | 0.0569 | −4.279E−005 | −8.825E−009 | 2.826E−009 | 0 |
| S310 | −1.117569 | −1.062E−004 | −1.092E−007 | 1.021E−009 | −9.823E−012 |
| S311 | −0.546811 | 1.664E−005 | 6.949E−008 | 2.163E−010 | −4.986E−013 |

Table 9 shows the parameters and condition values for conditions (1)-(12) in accordance with the third embodiment of the invention. It can be seen from Table 9 that the optical lens assembly 3 of the third embodiment satisfies the conditions (1)-(12).

TABLE 9

| $f_{123}$ | 14.37 mm | $f_{456}$ | 28.47 mm | AOI | 34 degrees |
|---|---|---|---|---|---|
| AOE | 17 degrees | FOV | 68 degree | TTL | 57.0006 mm |
| BFL | 100 mm | | | | |
| $f_{456}/f_{123}$ | 1.98 | FOV/TTL | 1.19 degree/mm | TTL/BFL | 0.57 |

By the above arrangements of the lenses and stop ST3, the optical lens assembly 3 of the third embodiment can meet the requirements of optical performance.

In addition, the wavefront function diagram (figure is omitted) of the optical lens assembly 3 of the third embodiment approximate to that of the optical lens assembly 1 of the first embodiment, and the wavefront aberration of the optical lens assembly 3 of the third embodiment can be corrected effectively. Therefore, the optical lens assembly 3 of the third embodiment is capable of good optical performance.

In the field of lens design, the shape of any lenses will affect the exit angle of the incident laser beam, which in turn affects the spot size. When the surface shape of any one of the lenses is changed, in order to maintain the same spot size, the surface shape of other lenses also needs to be modified, that is, the surface shape of any one of the lenses can never be simply changed at will. The effect of all the embodiments of this invention on the spot size of the incident laser beam cannot be achieved by arbitrarily changing the shape of any lenses of the known optical lens assembly.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical lens assembly comprising:
   a first lens which is a meniscus lens with positive refractive power;
   a second lens which is with positive refractive power;
   a third lens which is with negative refractive power;
   a fourth lens which is with positive refractive power and comprises a convex surface facing an image side;
   a fifth lens which is with negative refractive power and comprises a concave surface facing an object side; and
   a sixth lens which is with positive refractive power and comprises a convex surface facing the image side;
   wherein the first lens, the second lens, the third lens, the fourth lens, the fifth lens, and the sixth lens are arranged in order from the object side to the image side along an optical axis.

2. The optical lens assembly as claimed in claim 1, wherein:
   the fourth lens further comprises a concave surface facing the object side;
   the fifth lens further comprises a convex surface facing the image side; and
   the sixth lens further comprises a concave surface facing the object side.

3. The optical lens assembly as claimed in claim 2, wherein the optical lens assembly satisfies $1.9 < f_{456}/f_{123} < 2.1$, where $f_{123}$ is an effective focal length of a combination of the first lens, the second lens, and the third lens and $f_{456}$ is an effective focal length of a combination of the fourth lens, the fifth lens, and the sixth lens;

wherein the optical lens assembly satisfies: any one of the $Nd_1$, $Nd_2$, $Nd_4$, and $Nd_6$ is greater than any one of the $Nd_3$ and $Nd_5$; AOE=AOI/2; wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly;

wherein an object side surface and an image side surface of the third lens are aspheric surfaces, the concave surface and an image side surface of the fifth lens are aspheric surfaces, and the optical lens assembly further comprises a stop disposed between the object side and the first lens; or wherein the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

4. The optical lens assembly as claimed in claim 1, wherein the second lens, the third lens, the fourth lens, the fifth lens, and the sixth lens are meniscus lenses.

5. The optical lens assembly as claimed in claim 4,
wherein the optical lens assembly satisfies $1.9<f_{456}/f_{123}<2.1$, where $f_{123}$ is an effective focal length of a combination of the first lens, the second lens, and the third lens and $f_{456}$ is an effective focal length of a combination of the fourth lens, the fifth lens, and the sixth lens;

wherein the optical lens assembly satisfies: any one of the $Nd_1$, $Nd_2$, $Nd_4$, and $Nd_6$ is greater than any one of the $Nd_3$ and $Nd_5$; AOE=AOI/2; wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly;

wherein an object side surface and an image side surface of the third lens are aspheric surfaces, the concave surface and an image side surface of the fifth lens are aspheric surfaces, and the optical lens assembly further comprises a stop disposed between the object side and the first lens; or wherein the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

6. The optical lens assembly as claimed in claim 1, wherein the optical lens assembly satisfies:
$1.9<f_{456}/f_{23}<2.1$;
wherein $f_{123}$ is an effective focal length of a combination of the first lens, the second lens, and the third lens and $f_{456}$ is an effective focal length of a combination of the fourth lens, the fifth lens, and the sixth lens.

7. The optical lens assembly as claimed in claim 1, wherein the optical lens assembly satisfies:
any one of the $Nd_1$, $Nd_2$, $Nd_4$, and $Nd_6$ is greater than any one of the $Nd_3$ and $Nd_5$;
AOE=AOI/2;

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly.

8. The optical lens assembly as claimed in claim 1,
wherein an object side surface and an image side surface of the third lens are aspheric surfaces, the concave surface and an image side surface of the fifth lens are aspheric surfaces, and the optical lens assembly further comprises a stop disposed between the object side and the first lens; or
wherein the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

9. An optical lens assembly comprising:
a first lens which is a meniscus lens with positive refractive power;
a second lens which is a meniscus lens with positive refractive power and comprises a convex surface facing an object side and a concave surface facing an image side;
a third lens which is a meniscus lens with negative refractive power and comprises a convex surface facing the object side and a concave surface facing the image side;
a fourth lens which is a meniscus lens with positive refractive power;
a fifth lens which is with negative refractive power; and
a sixth lens which is with positive refractive power;
wherein the first lens, the second lens, the third lens, the fourth lens, the fifth lens, and the sixth lens are arranged in order from the object side to the image side along an optical axis.

10. The optical lens assembly as claimed in claim 9, wherein:
the fourth lens comprises a concave surface facing the object side and a convex surface facing the image side;
the fifth lens comprises a concave surface facing the object side and a convex surface facing the image side; and
the sixth lens comprises a convex surface facing the image side.

11. The optical lens assembly as claimed in claim 10, wherein the optical lens assembly satisfies $1.9<f_{456}/f_{123}<2.1$, where $f_{123}$ is an effective focal length of a combination of the first lens, the second lens, and the third lens and $f_{456}$ is an effective focal length of a combination of the fourth lens, the fifth lens, and the sixth lens;

wherein the optical lens assembly satisfies: any one of the $Nd_1$, $Nd_2$, $Nd_4$, and $Nd_6$ is greater than any one of the $Nd_3$ and $Nd_5$; AOE=AOI/2; wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly;

wherein an object side surface and an image side surface of the third lens are aspheric surfaces, the concave surface and an image side surface of the fifth lens are aspheric surfaces, and the optical lens assembly further comprises a stop disposed between the object side and the first lens; or wherein the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

12. The optical lens assembly as claimed in claim 9, wherein the optical lens assembly satisfies:

$1.9 < f_{456}/f_{123} < 2.1$;

wherein $f_{123}$ is an effective focal length of a combination of the first lens, the second lens, and the third lens and $f_{456}$ is an effective focal length of a combination of the fourth lens, the fifth lens, and the sixth lens.

13. The optical lens assembly as claimed in claim 9, wherein the optical lens assembly satisfies:

any one of the $Nd_1$, $Nd_2$, $Nd_4$, and $Nd_6$ is greater than any one of the $Nd_3$ and $Nd_5$;

AOE=AOI/2;

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly.

14. The optical lens assembly as claimed in claim 9, wherein an object side surface and an image side surface of the third lens are aspheric surfaces, the concave surface and an image side surface of the fifth lens are aspheric surfaces, and the optical lens assembly further comprises a stop disposed between the object side and the first lens; or wherein the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

15. An optical lens assembly comprising:

a first lens which is a meniscus lens with positive refractive power;

a second lens which is a meniscus lens with positive refractive power and comprises a convex surface facing an object side and a concave surface facing an image side;

a third lens which is with negative refractive power and comprises a concave surface facing the image side;

a fourth lens which is with positive refractive power;

a fifth lens which is a meniscus lens and comprises a concave surface facing the object side and a convex surface facing the image side; and a sixth lens which is with refractive power;

wherein the first lens, the second lens, the third lens, the fourth lens, the fifth lens, and the sixth lens are arranged in order from the object side to the image side along an optical axis;

wherein the optical lens assembly satisfies:

$1.81 < f_{456}/f_{123} < 2.12$;

wherein $f_{123}$ is an effective focal length of a combination of the first lens, the second lens, and the third lens and $f_{456}$ is an effective focal length of a combination of the fourth lens, the fifth lens, and the sixth lens.

16. The optical lens assembly as claimed in claim 15, wherein:

the fourth lens comprises a convex surface facing the image side; and the sixth lens comprises a convex surface facing the image side.

17. The optical lens assembly as claimed in claim 16, wherein the optical lens assembly satisfies: any one of the $Nd_1$, $Nd_2$, $Nd_4$, and $Nd_6$ is greater than any one of the $Nd_3$ and $Nd_5$; AOE=AOI/2;

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly;

wherein an object side surface and an image side surface of the third lens are aspheric surfaces, the concave surface and an image side surface of the fifth lens are aspheric surfaces, and the optical lens assembly further comprises a stop disposed between the object side and the first lens; or wherein the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

18. The optical lens assembly as claimed in claim 15, wherein the optical lens assembly satisfies:

$1.9 < f_{456}/f_{123} < 2.1$;

wherein $f_{123}$ is an effective focal length of a combination of the first lens, the second lens, and the third lens and $f_{456}$ is an effective focal length of a combination of the fourth lens, the fifth lens, and the sixth lens.

19. The optical lens assembly as claimed in claim 15, wherein the optical lens assembly satisfies:

any one of the $Nd_1$, $Nd_2$, $Nd_4$, and $Nd_6$ is greater than any one of the $Nd_3$ and $Nd_5$;

AOE=AOI/2;

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, AOI is an angle of incidence of the optical lens assembly, and AOE is an angle of emergence of the optical lens assembly.

20. The optical lens assembly as claimed in claim 15, wherein an object side surface and an image side surface of the third lens are aspheric surfaces, the concave surface and an image side surface of the fifth lens are aspheric surfaces, and the optical lens assembly further comprises a stop disposed between the object side and the first lens; or wherein the optical lens assembly satisfies 0.8 degree/mm<FOV/TTL<1.5 degree/mm, where FOV is a field of view of the optical lens assembly and TTL is an interval from an object side surface of the first lens to the convex surface of the sixth lens along the optical axis.

\* \* \* \* \*